(12) United States Patent
Hsieh (10) Patent No.: US 11,824,463 B1
(45) Date of Patent: Nov. 21, 2023

(54) MULTIPLE OUTPUT VOLTAGE GENERATOR

(71) Applicant: Novatek Microelectronics Corp., Hsinchu (TW)

(72) Inventor: Chun-Yu Hsieh, Miaoli County (TW)

(73) Assignee: Novatek Microelectronics Corp., Hsinchu (TW)

( * ) Notice: Subject to any disclaimer, the term of this patent is extended or adjusted under 35 U.S.C. 154(b) by 13 days.

(21) Appl. No.: 17/732,519

(22) Filed: Apr. 29, 2022

(51) Int. Cl.
*H02M 7/487* (2007.01)
*H02M 3/158* (2006.01)
*H02M 1/088* (2006.01)
*H02M 1/00* (2006.01)

(52) U.S. Cl.
CPC .......... *H02M 7/487* (2013.01); *H02M 1/008* (2021.05); *H02M 1/009* (2021.05); *H02M 1/088* (2013.01); *H02M 3/158* (2013.01)

(58) Field of Classification Search
CPC ...... H02M 3/158; H02M 1/008; H02M 1/009; H02M 1/088; H02M 7/487
See application file for complete search history.

(56) References Cited

U.S. PATENT DOCUMENTS

| | | | | |
|---|---|---|---|---|
| 7,132,765 | B2 * | 11/2006 | Premont | H02M 3/157 |
| | | | | 307/81 |
| 10,135,336 | B2 * | 11/2018 | Li | H02M 3/1584 |
| 10,637,356 | B2 * | 4/2020 | Mehas | H02M 3/1584 |
| 11,362,585 | B2 * | 6/2022 | Rizzolatti | H02M 1/083 |
| 2009/0039947 | A1 * | 2/2009 | Williams | H02M 3/07 |
| | | | | 327/536 |
| 2012/0154013 | A1 * | 6/2012 | Mera | G11C 11/4074 |
| | | | | 327/333 |
| 2014/0268946 | A1 * | 9/2014 | Liu | H02M 3/07 |
| | | | | 363/60 |
| 2015/0130367 | A1 * | 5/2015 | Bae | G09G 3/3233 |
| | | | | 315/291 |
| 2015/0188362 | A1 * | 7/2015 | Mondal | H02J 9/062 |
| | | | | 307/52 |
| 2016/0118886 | A1 * | 4/2016 | Zhang | H02M 3/158 |
| | | | | 323/271 |
| 2016/0329810 | A1 * | 11/2016 | Lee | H02M 3/07 |
| 2017/0324321 | A1 * | 11/2017 | Høyerby | H02M 7/4837 |
| 2017/0331374 | A1 * | 11/2017 | Høyerby | H03F 3/183 |
| 2019/0190373 | A1 * | 6/2019 | Nussbaum | H02M 3/07 |
| 2019/0348913 | A1 * | 11/2019 | Zhang | H02M 1/08 |
| 2020/0161959 | A1 * | 5/2020 | Chuang | H02M 3/07 |
| 2021/0067033 | A1 * | 3/2021 | Jing | H02M 3/158 |
| 2021/0184571 | A1 * | 6/2021 | Sblano | H02M 1/38 |

(Continued)

OTHER PUBLICATIONS

Akhila V.T et al., "Comparative Study of Modified Three-Level Buck Converter Topology," International Journal of Engineering Research & Technology (IJERT), vol. 4, Feb. 2015, pp. 128-132.

*Primary Examiner* — Yusef A Ahmed
(74) *Attorney, Agent, or Firm* — JCIPRNET (57) ABSTRACT

A multiple output voltage generator includes a voltage divider and first and second voltage converters. The voltage divider receives a power voltage and divides the power voltage to generate a first output voltage. The first and second voltage converters are coupled to the voltage divider in parallel. The first voltage converter and the second voltage converter converting the first output voltage to respectively generate a second output voltage and a third output voltage.

15 Claims, 7 Drawing Sheets

(56) References Cited

U.S. PATENT DOCUMENTS

| | | | |
|---|---|---|---|
| 2022/0029534 A1* | 1/2022 | Chen | H02M 3/158 |
| 2022/0075401 A1* | 3/2022 | Lee | H02M 3/072 |
| 2022/0231601 A1* | 7/2022 | Jong | H02M 1/0043 |
| 2022/0231618 A1* | 7/2022 | Yan | H02M 1/0025 |
| 2023/0006555 A1* | 1/2023 | Jung | H02M 3/07 |
| 2023/0029565 A1* | 2/2023 | Yu | H02M 1/14 |
| 2023/0050531 A1* | 2/2023 | Lee | H02M 3/07 |

* cited by examiner

MULTIPLE OUTPUT VOLTAGE GENERATOR

BACKGROUND

Field of the Invention

The invention relates to a multiple output voltage generator and more particularly, to a hybrid single inductor multiple output (SIMO) voltage converter.

Description of Related Art

A single inductor dual output voltage generator in conventional art includes two transistor switches and one inductor, and converts a power voltage to generate an output voltage by the transistor switches alternatively. In a case that a front end of the transistor switches receiving the power voltage with high voltage level, the transistor switches need to be implemented by electronic components with high voltage endurance. Such as that, a circuit size and conductive loss are increased. Furthermore, in this case, the inductor needs to swing between a large voltage range, switching loss including MOS gate/drain loss (due to parasitic capacitance), reverse recovery loss and MOS switching loss causes an efficiency of power conversion reduced. Also, the inductor also causes large electromagnetic interference (EMI) and the efficiency of power conversion is further reduced.

SUMMARY

The invention provides a multiple output voltage generator which can improve power efficiency thereof.

According to an embodiment of the invention, the multiple output voltage generator includes a voltage divider and first and second voltage converters. The voltage divider receives a power voltage and divides the power voltage to generate a first output voltage. The first and second voltage converters are coupled to the voltage divider in parallel. The first voltage converter and the second voltage converter converting the first output voltage to respectively generate a second output voltage and a third output voltage.

To sum up, the multiple output voltage generator of present disclosure provides the voltage divider to generate a first output voltage by dividing a power voltage, and the first and second voltage converters can respectively generate different output voltages based on the first output voltage. Such as that, the first and second voltage converters can be implemented by electronic components with low voltage endurance, a quiescent current of the multiple output voltage generator can be reduced and power efficiency of the multiple output voltage generator can be improved, too.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 1:
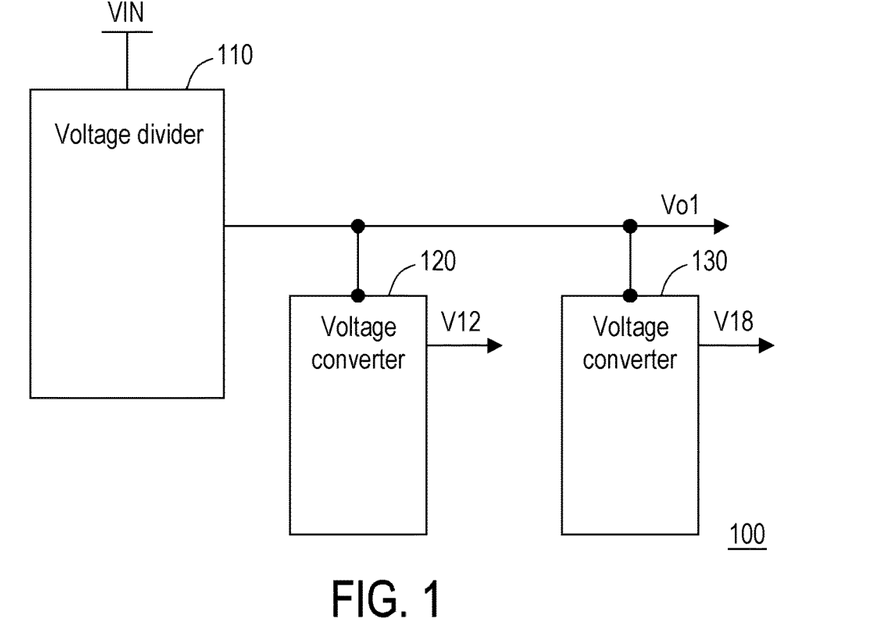
FIG. 1 illustrates a schematic diagram of a multiple output voltage generator according to an embodiment of present disclosure.

Please refer to FIG. 1, which illustrates a schematic diagram of a multiple output voltage generator according to an embodiment of present disclosure. The multiple output voltage generator 100 includes a voltage divider 110, a first and second voltage converters 120 and 130. The voltage divider 110 receives a power voltage VIN, and generates a first output voltage Vo1 by dividing the power voltage VIN. The first and second voltage converters 120 and 130 are coupled to an output end of the voltage divider 110 in parallel. The first voltage converter 120 receives the first output voltage Vo1 and generates a second output voltage V12 according to the first output voltage Vo1. The second voltage converter 130 receives the first output voltage Vo1 and generates a third output voltage V18 according to the first output voltage Vo1. In present embodiment, both of the second output voltage V12 and the third output voltage V18 are smaller than the first output voltage Vo1.

It should be noted here, the voltage divider 110 generates the first output voltage Vo1 by dividing the power voltage VIN. In some embodiment, the first output voltage Vo1 may be half of the power voltage VIN. Such as that, the first output voltage Vo1 is smaller than the power voltage VIN. Further, the voltage divider 110 provides the first output voltage Vo1 to be operation powers of the first and second voltage converters 120 and 130. That is, the first and second voltage converters 120 and 130 may be operated based on the first output voltage Vo1 with a relative low voltage value, and power consumption of the first and second voltage converters 120 and 130 can be reduced. Moreover, by reducing power voltages of the first and second voltage converters 120 and 130, the first and second voltage converters 120 and 130 may be implemented by circuit components with low voltage endurance. Such as that, circuit size and cost of the multiple output voltage generator 100 can be reduced.

On the other hand, in present disclosure, each of the first and second voltage converters 120 and 130 may be DC to DC converter or a low drop-out (LDO) voltage regulator. In some embodiment, both of the first and second voltage converters 120 and 130 may be DC to DC converters, and the two DC to DC converters may have different circuit structures.

Figure 2:
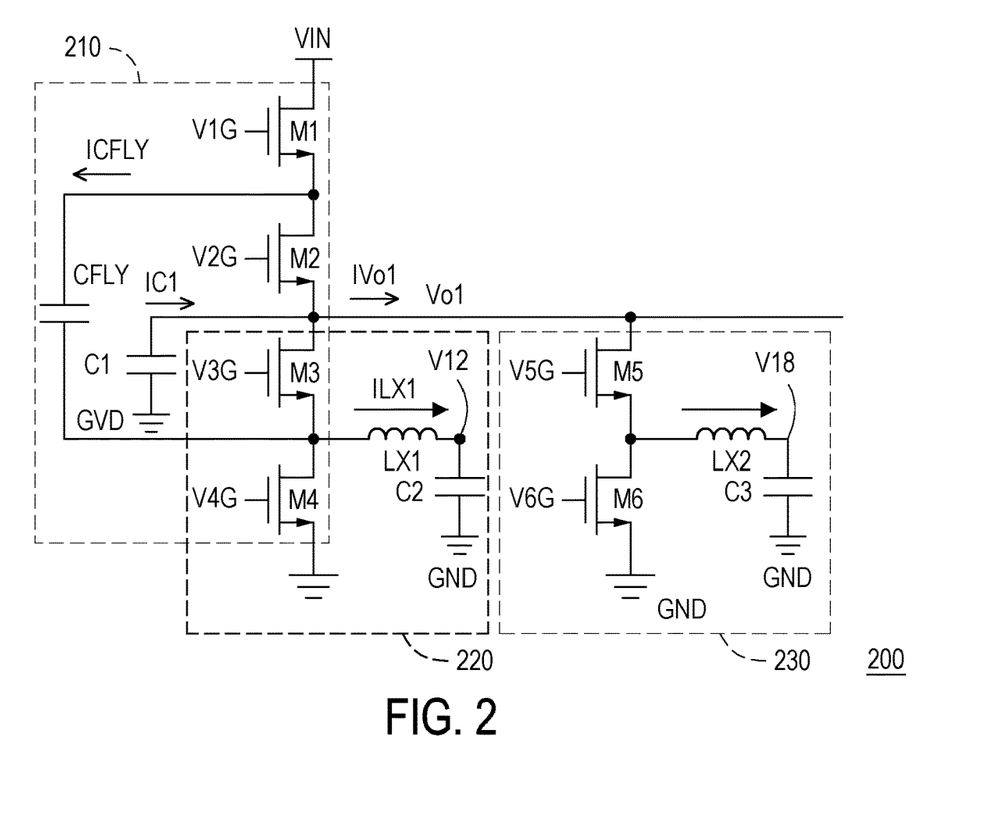
FIG. 2 illustrates a schematic diagram of a multiple output voltage generator according to another embodiment of present disclosure.

Please refer to FIG. 2, which illustrates a schematic diagram of a multiple output voltage generator according to another embodiment of present disclosure. The multiple output voltage generator 200 includes a voltage divider 210, a first and second voltage converters 220 and 230. In this embodiment, the voltage divider 210 includes transistors M1 to M4 and capacitors C1 and CFLY. The transistors M1 to M4 are coupled in series between a power voltage VIN and a reference ground end GND. The capacitor CFLY is coupled between a coupling end of the transistors M1 and M2 and a coupled end of the transistors M3 and M4. The capacitor C1 is coupled between a coupling end of the transistors M2 and M3 and the reference ground end GND. The coupling end of the transistors M2 and M3 performs an output end of the voltage divider 210 for outputting a first output voltage Vo1. Control ends of the transistors M1 to M4 respectively receive control signals V1G to V4G, and the transistors M1 to M4 may perform switching operation according to the control signals V1G to V4G.

Figure 3:
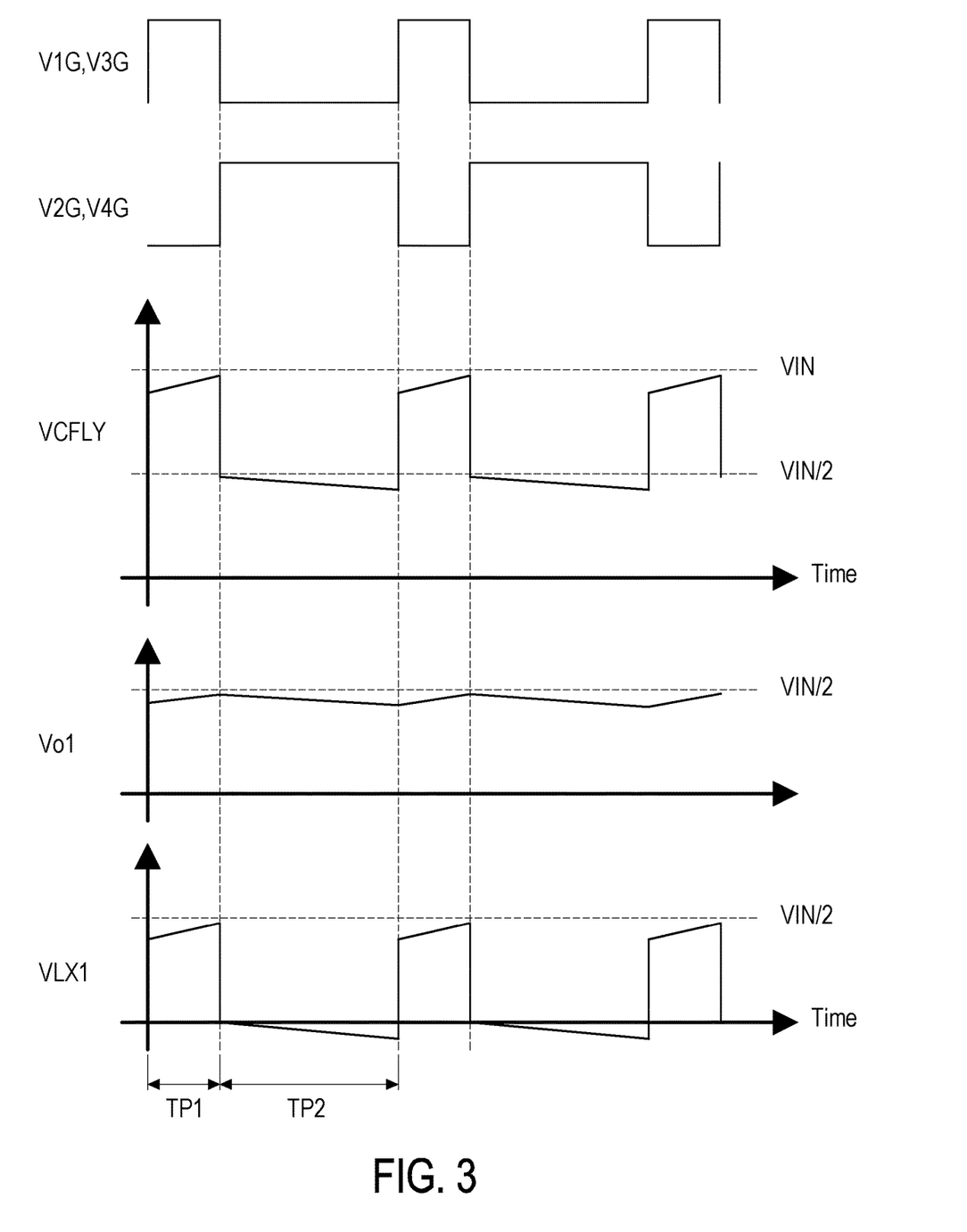
FIG. 3. illustrates waveform plot of the first voltage converter of the according to multiple output voltage generator according to an embodiment of present disclosure.

Please refer to FIG. 2 and FIG. 3 commonly. FIG. 3. illustrates waveform plot of the first voltage converter of the according to multiple output voltage generator according to an embodiment of present disclosure. About detail operation of the voltage divider 210, at a first phase (time period TP1), the control signals V1G and V3G are at a high voltage level, and the control signals V2G and V4G is at a low voltage level, such that the transistors M1 and M3 may be turned on according to the control signals VG1 and VG3 simultaneously and the transistors M2 and M4 may be cut off according to the control signals VG2 and VG4 simultaneously. The control signal V1G is complementary to the control signal V2G. The control signals V1G and V3G have same waveforms and the control signals V2G and V4G have same waveforms. In this manner, the capacitors CFLY may be coupled to the capacitor C1 in series between the power voltage VIN and the reference ground end. During the first phase, both of the capacitors CFLY and C1 are charged by the power voltage VIN. A voltage VCFLY on the capacitor CFLY can be charged to the power voltage VIN through the turned-on transistor M1, and the first output voltage Vo1 can be charged to half of the power voltage VIN(=VIN/2) by dividing the power voltage VIN if capacitances of the capacitors CFLY and C1 are same.

Besides, the first output voltage Vo1 may be fed to the inductor LX1 through the turned-on transistor M3. Such as that, a voltage VLX1 on the inductor LX1 may be raised to VIN/2 during the first phase.

At a second phase (time period TP2) after the first phase, the control signals V1G and V3G transit to the high voltage level, and the control signals V2G and V4G transit to the high voltage level, such that the transistors M1 and M3 may be cut off according to the control signals VG1 and VG3 simultaneously and the transistors M2 and M4 may be turned on according to the control signals VG2 and VG4 simultaneously. At this manner, the capacitors CFLY and CL may be coupled in parallel, the voltage VCFLY on the capacitor CFLY and the first output voltage Vo1 are equaled by the parallel connected capacitors CFLY and C1, and charges in the capacitors CFLY and CL may be shared. Also, the voltage VLX1 on the inductor LX1 is pulled toward to a reference ground voltage by the turned-on transistor M4, and a second output voltage V12 can be generated on a coupling end (a switching node) between the inductor LX1 and the capacitor C2.

Time lengths of the first phase and the second phase may be same or different. In this embodiment, the time periods TP1 and TP2 may be different. That is, a duty cycle of each of the control signals V1G to V4G doesn't need to be 50%.

If conductive types of the transistors M1 to M4 are the same, phases of the control signals V1G and V3G are same, phases of the control signals V2G and V4G are same, and the phases of the control signals V1G and V2G are complementary.

In this embodiment, during the time period TP1, a current ILX1 on the inductor LX1=a current ICFLY on the capacitor CFLY+a current IC1 on the capacitor C1−a current Ivo1 on the output end of the voltage divider 210. During the time period TP2, the current ILX1 on the inductor LX1=the current IC1 on the capacitor C1+the current Ivo1 on the output end of the voltage divider 210. By the waveform of the voltage VLX1 in FIG. 3, it can be seen that a voltage swing of the voltage VLX1 is only VDD/2. That is, electromagnetic interference (EMI) caused by the first voltage converter 220 may be reduced efficiency, and a performance of the multiple output voltage generator 200 can be improved.

Please be noted here, since switching operation performed by the voltage divider 210 is a soft switching behavior. That is, no extra power loss may be occurred in the operation, and the voltage divider 210 provides higher voltage conversion efficiency than a voltage converter. Also, the first output voltage Vo1 is generated by charge sharing by the capacitors C1 and CFLY, and the first output voltage Vo1 can be fixed to a target value (=½*VIN).

In this embodiment, only the transistor M1 receives the power voltage with high voltage value. That is, voltage endurance of any one of the transistors M2 to M4 may be lower than a voltage endurance of the transistor M1. A circuit size of the voltage divider 210 may be reduced by implementing the transistors M2 to M4 by low voltage endurance components.

On the other hand, in this embodiment, the first and second voltage converters 220 and 230 are DC to DC voltage converters. The first voltage converter 220 is a buck converter, and includes the transistors M3 and M4, an inductor LX1 and a capacitor C2. The inductor LX1 and the capacitor C2 are coupled in series between a coupling end of the transistors M3 and M4 and the reference ground end GND. In this embodiment, the first voltage converter 220 and the voltage divider 210 share the transistors M3 and M4.

The second voltage converter 230 includes transistors M5 and M6, an inductor LX2 and a capacitor C3. The transistors M5 and M6 are coupled in series between the output end of the voltage divider 210 and the reference ground end GND. Control ends of the transistors M5 and M6 respectively receive control signals V5G and V6G. The inductor LX2 and the capacitor C3 are coupled in series between a coupling end of the transistors M5 and M6 and the reference ground end GND.

Detail operation of the second voltage converter 230 is same to the first voltage converter 220, and no more repeated description here.

The transistors M5 and M6 can be alternatively turned-on and cut-off, and a third output voltage V18 can be generated at a coupling end (a switching node) of the inductor LX2 and the capacitor C3. Since the transistors M5 and M6 receive the power voltage VIN as the operation power, the transistors M5 and M6 may be implemented by low voltage endurance components, and circuit size can be reduced.

Please be noted here, in this embodiment, the second output voltage V12 may be smaller than the third output voltage V18.

Figure 4:
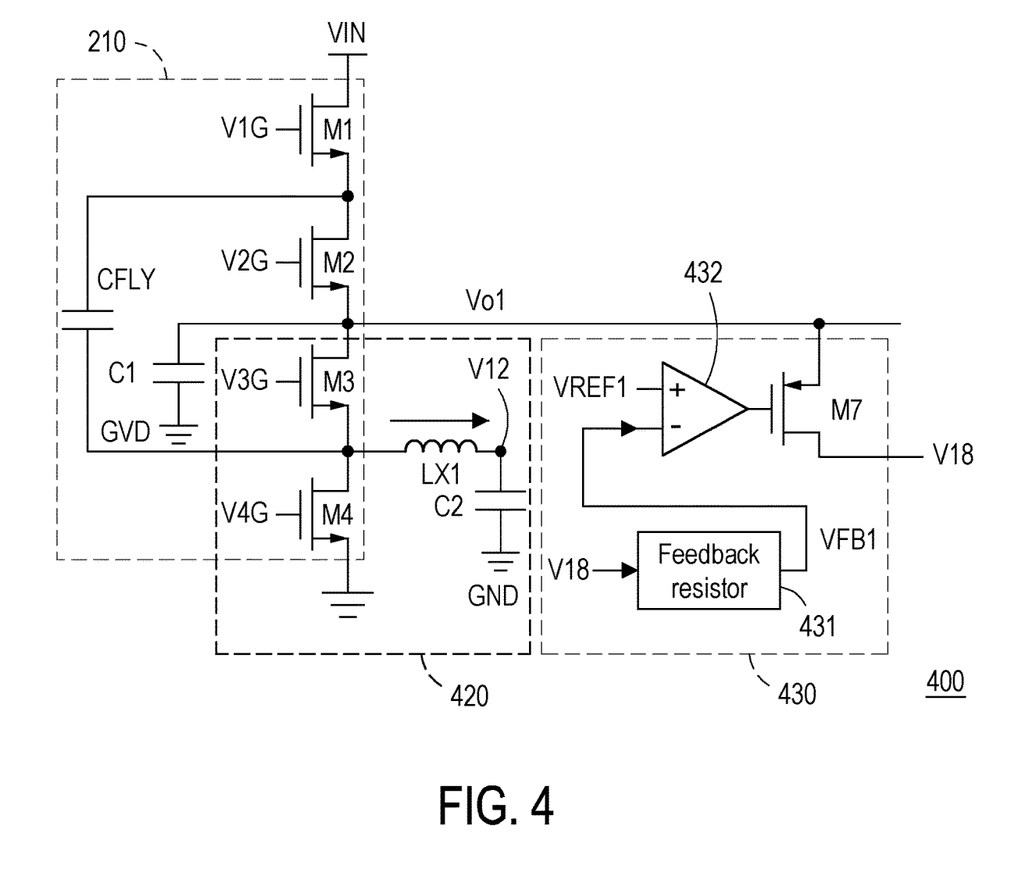
FIG. 4 illustrates a schematic diagram of a multiple output voltage generator according to another embodiment of present disclosure.

Please refer to FIG. 4, which illustrates a schematic diagram of a multiple output voltage generator according to another embodiment of present disclosure. The multiple output voltage generator 400 includes a voltage divider 410 and a first and second voltage converters 420 and 430. The voltage divider 410 includes transistors M1 to M4 and capacitors C1 and CFLY. The transistors M1 to M4 are respectively controlled by control signals V1G to V4G. Detail operations of the voltage divider 410 is same as the voltage divider 210 in FIG. 2, and no more repeated description here.

The first voltage converter 420 includes the transistors M3 and M4, an inductor LX1 and a capacitor C2. Also, detail operation of the first voltage converter 420 is same as the first voltage converter 220 in FIG. 2, and no more repeated description here.

The second voltage converter 430 is a low-dropout voltage regulator, and includes a feedback resistor 431, an error amplifier 432 and a transistor M7. The feedback resistor 431 may receive a third output voltage V18 of the second voltage converter 430, and generate the feedback voltage VFB1 according to the third output voltage V18. The error amplifier 432 has a negative input end for receiving the feedback voltage, and a positive input end for receiving a reference voltage VREF1. A first end of the transistor M7 receives the first output voltage Vo1, and a second end of the transistor M7 generates the third output voltage V18. A control end of the transistor M7 is coupled to an output end of the error amplifier 432.

In detail, the feedback resistor 431 may be a resistor string and be used to divide the second output voltage V18 to generate the feedback voltage VFB1. The error amplifier 432 compares the feedback voltage VFB1 with the reference voltage VREF1, and amplifies an error between the feedback voltage VFB1 and the reference voltage VREF1 to control the transistor M7.

In this embodiment, by receiving the first output voltage Vo1 as an operation power, a power efficiency of the second voltage converter 430 which is a low-dropout voltage regulator can be improved.

In this embodiment, the reference voltage VREF1 may be a preset voltage.

Figure 5:
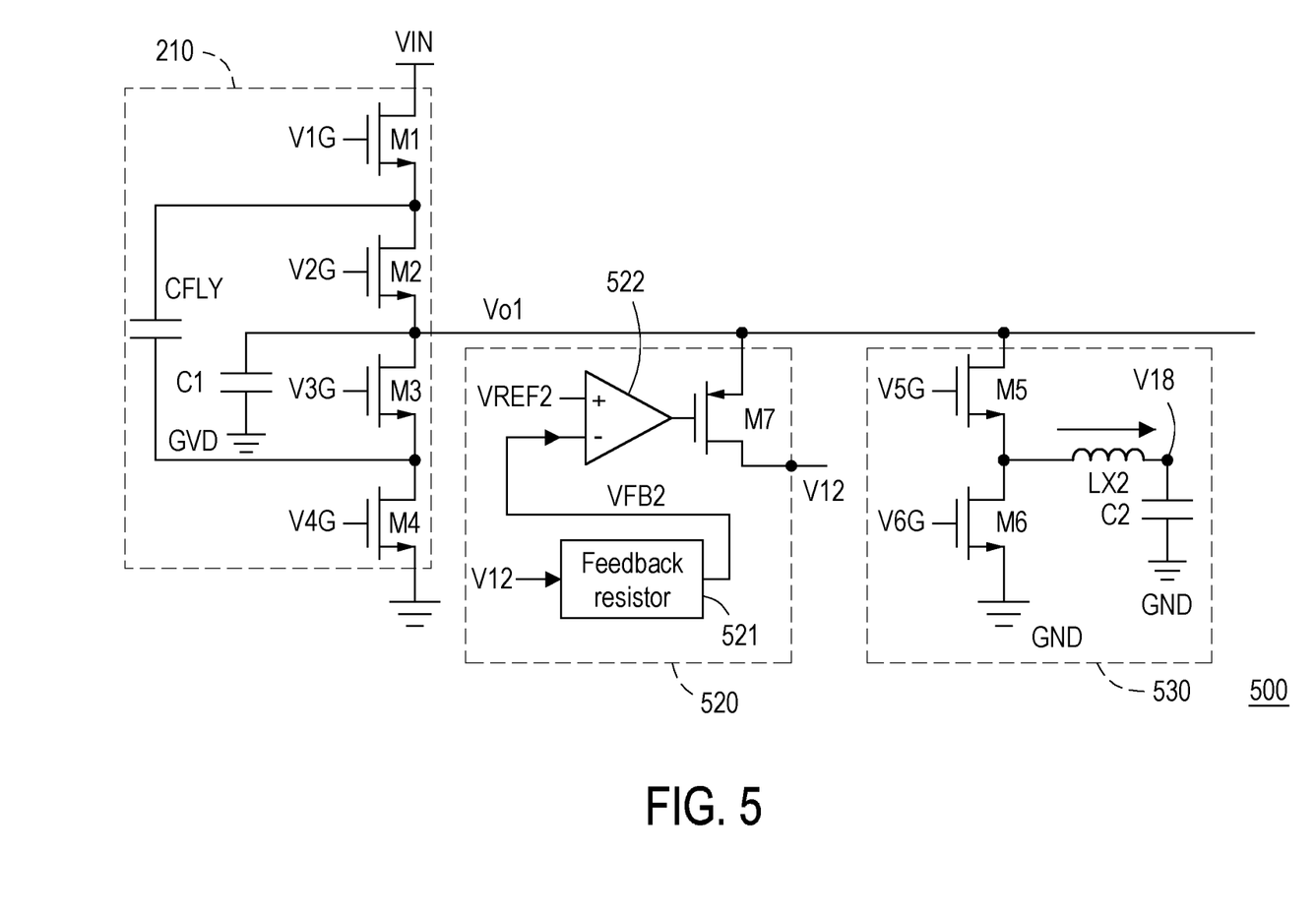
FIG. 5, which illustrates a schematic diagram of a multiple output voltage generator according to another embodiment of present disclosure.

Please refer to FIG. 5, which illustrates a schematic diagram of a multiple output voltage generator according to another embodiment of present disclosure. The multiple output voltage generator 500 includes a voltage divider 510 and a first and second voltage converters 520 and 530. Different from the multiple output voltage generator 400, in this embodiment, the first voltage converter 520 is a low-drop out voltage generator, and the second voltage converter 530 is a DC to DC converter. The first voltage converter 520 includes a feedback resistor 521, an error amplifier 522 and a transistor M7. The feedback resistor 521 receives a second output voltage V12 and generates a feedback voltage VFB2 by dividing the second output voltage V12. The error amplifier 522 amplifies an error between the feedback voltage VFB2 and a reference voltage VREF2 to control the transistor M7. The transistor M7 receives the first out voltage Vo1 and generates the second output voltage V12.

The second voltage converter 530 includes transistors M5 and M6, an inductor LX2 and a capacitor C2. The second voltage converter 530 may be a buck converter. The transistors M5 and M6 are coupled in series between the first output voltage Vo1 and the reference ground end GND, and are respectively controlled by control signals V5G and V6G. The inductor LX2 and the capacitor C2 are coupled in series between a coupling end of the transistors M5 and M6 and the reference ground end. The second voltage converter 530 receives the first output voltage Vo1 as an operation power, and generates a third output voltage V18 by converting the first output voltage Vo1.

In this embodiment, the reference voltage VREF2 may be a preset voltage.

Figure 6:
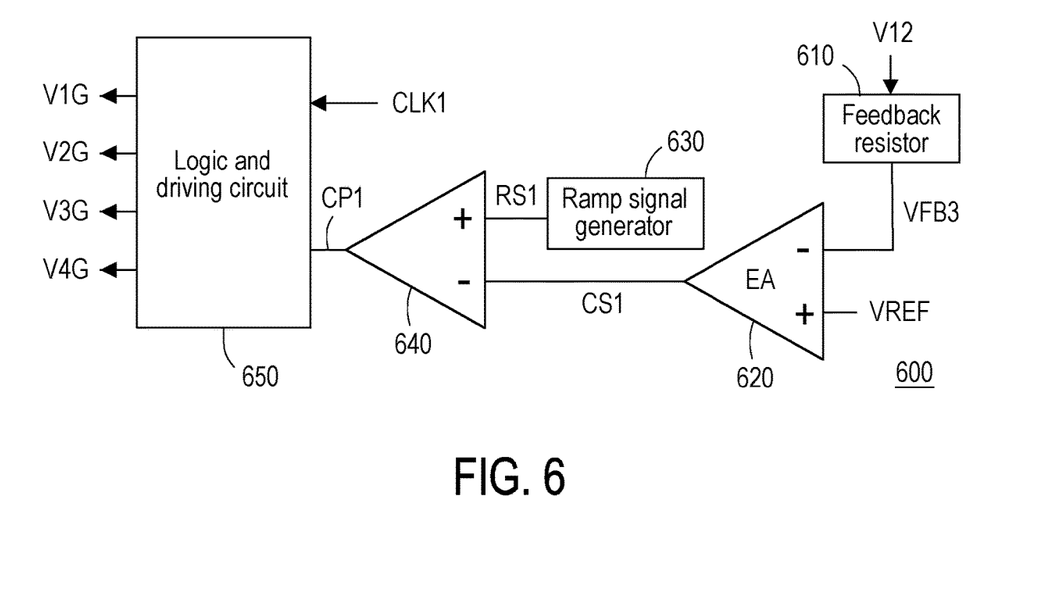
FIG. 6 illustrates a schematic diagram of a control signal generator for the voltage divider of the multiple output voltage generator according to an embodiment of present disclosure.

Please refer to FIG. 2 and FIG. 6 commonly, wherein FIG. 6 illustrates a schematic diagram of a control signal generator for the voltage divider of the multiple output voltage generator according to an embodiment of present disclosure. The control signal generator 600 is used to generate the control signals V1G to V4G for controlling operations of the voltage divider 210. The control signal generator 600 includes a feedback resistor 610, an error amplifier 620, a ramp signal generator 630, a comparator 640 and a logic and driving circuit 650. The feedback resistor 610 may receive the second output voltage V12 and generate a feedback voltage VFB3 by dividing the second output voltage V12. The feedback resistor 610 provides the feedback voltage VFB3 to a negative input end of the error amplifier 620. The error amplifier 620 also receives a reference voltage VREF3 by a positive input end. The error amplifier 620 generates a signal CS1 according to a difference of the feedback voltage VFB3 and the reference voltage VREF3.

The ramp signal generator 630 generates a reference ramp signal RS1 to a positive input end of the comparator 640. The error amplifier 620 provides the signal CS1 to a negative input end of the comparator 640. The comparator 640 generates a signal CP1 by comparing the reference ramp signal RS1 with the signal CS1.

The logic and driving circuit 650 receives the signal CP1 and generates, based on a clock signal CLK1, the control signals V1G to V4G according to the signal CP1. The logic and driving circuit 650 may include a logic circuit core for performing logic operation on the signal CP1 to generate operation results. The logic and driving circuit 650 may also include a driving part to amplify to operation results to generate the control signals V1G to V4G.

In this embodiment, the reference voltage VREF3 may be a preset voltage.

Figure 7:
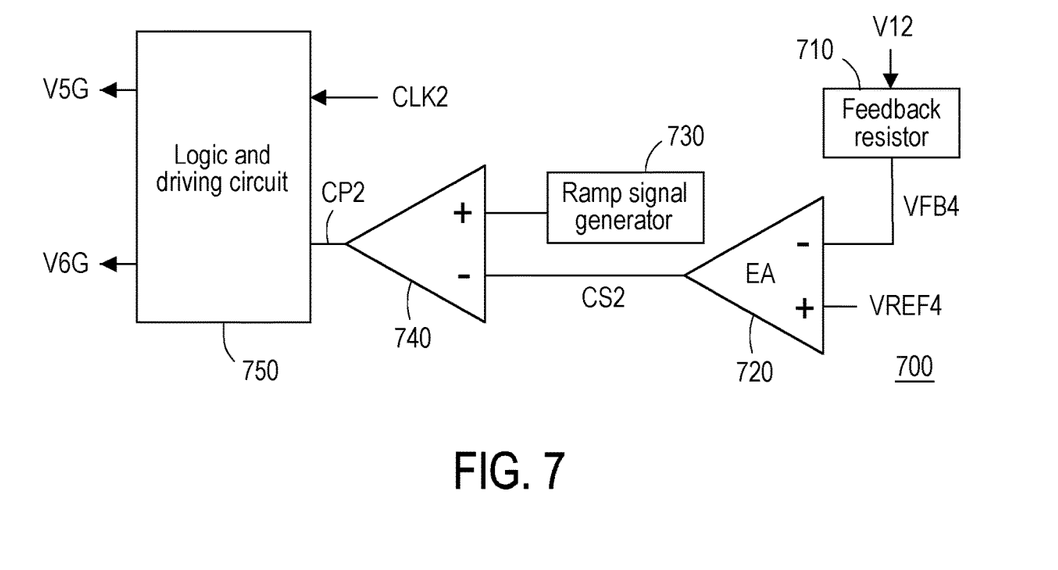
FIG. 7 illustrates a schematic diagram of a control signal generator for the voltage converter of the multiple output voltage generator according to an embodiment of present disclosure.

Please refer to FIG. 2 and FIG. 7 commonly, wherein FIG. 7 illustrates a schematic diagram of a control signal generator for the voltage converter of the multiple output voltage generator according to an embodiment of present disclosure. The control signal generator 700 is used to generate the control signals V5G and V6G for controlling the second voltage converter 230. The control signal generator 700 includes a feedback resistor 710, an error amplifier 720, a ramp signal generator 730, a comparator 740 and a logic and driving circuit 750. The feedback resistor 710 may receive the third output voltage V18 and generate a feedback voltage VFB34 by dividing the third output voltage V18. The feedback resistor 710 provides the feedback voltage VFB4 to a negative input end of the error amplifier 720. The error amplifier 720 also receives a reference voltage VREF4 by a positive input end. The error amplifier 720 generates a signal CS2 according to a difference of the feedback voltage VFB4 and the reference voltage VREF4.

The ramp signal generator 730 generates a reference ramp signal RS2 to a positive input end of the comparator 740. The error amplifier 720 provides the signal CS2 to a negative input end of the comparator 740. The comparator 740 generates a signal CP2 by comparing the reference ramp signal RS2 with the signal CS2.

The logic and driving circuit 750 receives the signal CP2 and generates, based on a clock signal CLK2, the control signals V5G and V6G according to the signal CP2. The logic and driving circuit 750 may include a logic circuit core for performing logic operation on the signal CP2 to generate operation results. The logic and driving circuit 750 may also include a driving part to amplify to operation results to generate the control signals V5G and V6G.

In this embodiment, the reference voltage VREF4 may be a preset voltage.

Figure 8:
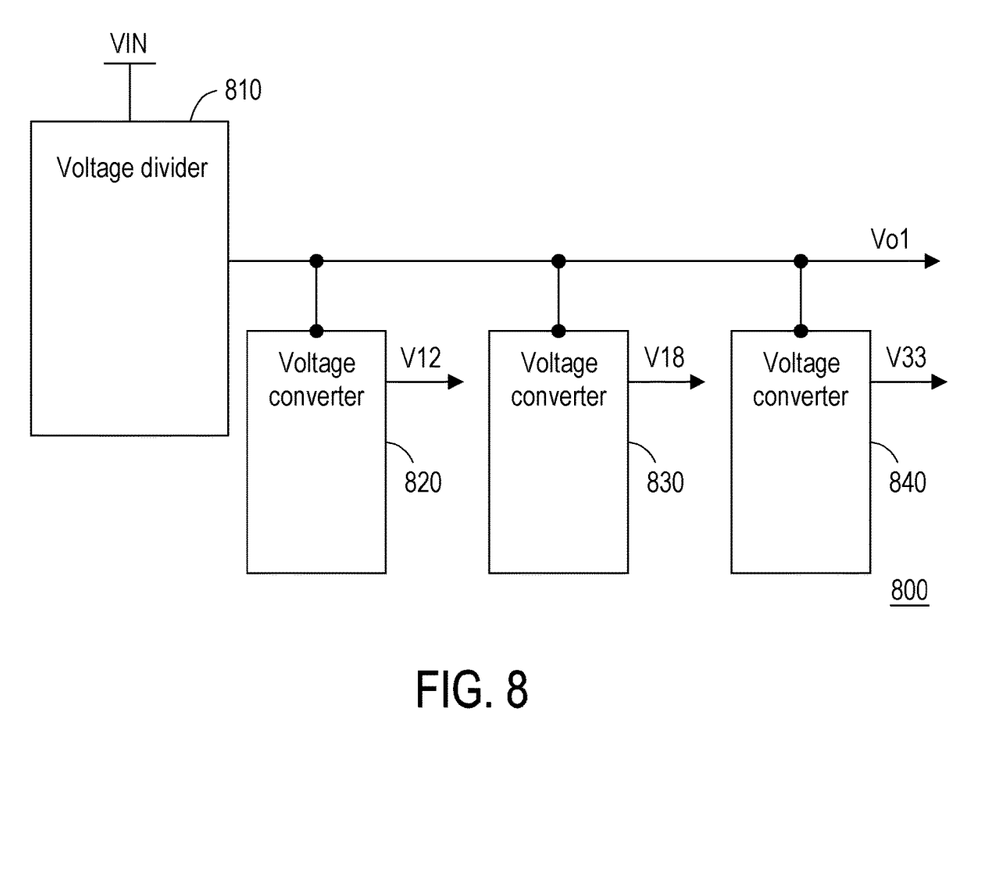
FIG. 8 illustrates a schematic diagram of a multiple output voltage generator according to another embodiment of present disclosure.

Please refer to FIG. 8, which illustrates a schematic diagram of a multiple output voltage generator according to another embodiment of present disclosure. The multiple output voltage generator 800 includes a voltage divider 810, a first voltage converter 820, a second voltage converter 830 and a third voltage converter 840. The voltage divider 810 receive a power voltage VIN, and generates a first output voltage Vo1 by dividing the power voltage VIN. In some embodiment, the first output voltage Vo1 may be half of the power voltage VIN.

The first voltage converter 820, the second voltage converter 830 and the third voltage converter 840 are coupled to an output end of the voltage divider 110 in parallel. All of the first voltage converter 820, the second voltage converter 830 and the third voltage converter 840 receive the first output voltage Vo1 as operation powers, and the first voltage converter 820, the second voltage converter 830 and the third voltage converter 840 respectively generate a second output voltage V12, a third output voltage V18 and a fourth output voltage V33.

In some embodiment, the first output voltage Vo1 is larger than each of the second output voltage V12, the third output voltage V18 and the fourth output voltage V33. On the other hand, the second output voltage V12 may be smaller than the third output voltage V18, and the third output voltage V18 may be smaller than the fourth output voltage V33.

In this embodiment, each of the first, second and third voltage converters 820, 830 and 840 may be DC to DC converter or a low drop-out (LDO) voltage regulator.

Figure 9:
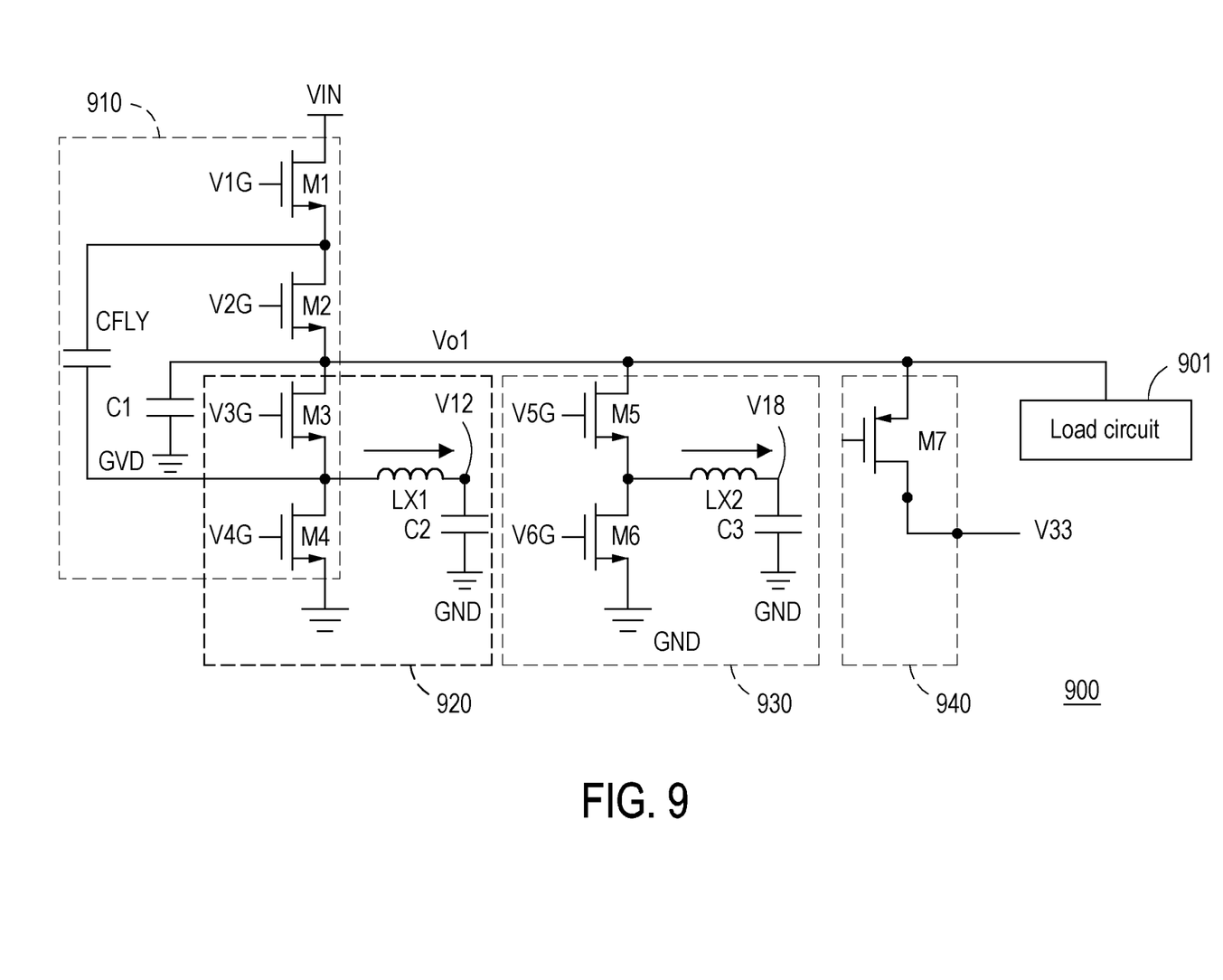
FIG. 9 illustrates a schematic diagram of a multiple output voltage generator according to another embodiment of present disclosure.

Please refer to FIG. 9, which illustrates a schematic diagram of a multiple output voltage generator according to another embodiment of present disclosure. The multiple output voltage generator 900 includes a voltage divider 910 and a first to third voltage converters 920 to 940. Th voltage divider 910 includes transistors M1 to M4 and capacitors CFLY and C1. Detail operation of the voltage divider 410 is same as the voltage divider 210 in FIG. 2, and no more repeated description here.

In this embodiment, both of the first to second voltage converters 920 to 930 are DC to DC converters. The third voltage converter 940 is a low drop-out voltage regulator. The first voltage converter 920 includes the transistors M3 and M4, an inductor LX1 and a capacitor C2. The second voltage converter 930 includes transistors M5 and M6, an inductor LX2 and a capacitor C3. Detail operation of the first voltage converter 920 and the second voltage converter 930 is same to the first voltage converter 220, and no more repeated description here.

The third voltage converter 940 may include a transistor M7, and detail operation of the third voltage converter 940 is same to the second voltage converter 430, and no more repeated description here.

It should be noted here, the multiple output voltage generator 900 may provide the first output voltage Vo1 to drive a load circuit 901. The load circuit 901 may be an internal circuit for a system, or the load circuit 901 may be a pre-driver for the DC to DC voltage converters used in the multiple output voltage generator 900. By reducing an operation voltage of the pre-driver, a quiescent current of the DC to DC voltage converters can be reduced, too.

In summary, if a power voltage is much higher than a second output voltage. To generate the second output voltage by converting the power voltage directly may generate large amount of power conversion loss. In this disclosure, the multiple output voltage generator may divide the power voltage and then convert the first output voltage to generate another output voltage. That is, power conversion loss can be reduced, and a conversion efficiency of the multiple output voltage generator can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A multiple output voltage generator, comprising:
    a voltage divider, receiving a power voltage and dividing the power voltage to generate a first output voltage;
    first and second voltage converters, coupled to the voltage divider in parallel, wherein the first voltage converter and the second voltage converter converting the first output voltage to respectively generate a second output voltage and a third output voltage; and
    a control signal generator, coupled to the voltage divider and generating a first control signal, a second control signal, a third control signal and a fourth control signal,
    wherein the voltage divider comprises:
    a first transistor, a second transistor, a third transistor and a fourth transistor,
    wherein the first transistor, the second transistor, the third transistor and the fourth transistor are coupled in series between a power voltage receiving end and a reference ground end, the first transistor, the second transistor, the third transistor and the fourth transistor are respectively controlled by the first control signal, the second control signal, the third control signal and the fourth control signal, and a coupling end of the second transistor and the third transistor generates the first output voltage, a coupling end of the first transistor and the second transistor is coupled to one end of a first capacitor and a coupling end of the third transistor and the fourth transistor is coupled to the other end of the first capacitor, and the coupling end of the second transistor and the third transistor is coupled to one end of a second capacitor and the reference ground end is coupled to the other end of the second capacitor, wherein one of the first voltage converter and second voltage converter comprises:

the third transistor and the fourth transistor;

an inductor; and a capacitor, wherein the inductor and the capacitor are coupled between the coupling end of the third transistor and the fourth transistor and the reference ground end, wherein another one of the first voltage converter and the second voltage converter comprises:

a fifth transistor, having a first end receiving the first output voltage, and a control end of the fifth transistor receiving a fifth control signal;

a sixth transistor, having a first end coupled to a second end of the fifth transistor and generating the second output voltage, a control end of the sixth transistor receiving a sixth control signal, and a second end of the sixth transistor coupled to the reference ground end;

another inductor; and another capacitor, wherein the another capacitor and the another inductor are coupled in series between the second end of the fifth transistor and the reference ground end, wherein the control signal generator comprises:

an error amplifier, receiving a reference voltage and a feedback voltage, and generating a first signal according to a difference between the reference voltage and a feedback voltage;

a feedback resistor, receiving the second output voltage and generating the feedback voltage according to the second output voltage;

a comparator, receiving the first signal and a reference ramp signal, and generating a second signal by comparing the reference ramp signal with the first signal; and a logic and driving circuit, receiving the second signal and generating, based on a clock signal, the first control signal, the second control signal, the third control signal and the fourth control signal according to the second signal.

2. The multiple output voltage generator as claimed in claim 1, wherein the first output voltage is half of the power voltage.

3. The multiple output voltage generator as claimed in claim 1, wherein both of the first voltage converter and the second voltage converter are DC to DC voltage converters.

4. The multiple output voltage generator as claimed in claim 1, wherein a voltage endurance of the first transistor is higher than a voltage endurance of any one of the second transistor, the third transistor and the fourth transistor.

5. The multiple output voltage generator as claimed in claim 1, wherein the logic and driving circuit of the control signal generator generates, based on a clock signal, the fifth control signal and the sixth control signal according to the second signal.

6. The multiple output voltage generator as claimed in claim 1, further comprising:

a third voltage converter, coupled to the voltage divider, converting the first output voltage to generate a fourth output voltage.

7. The multiple output voltage generator as claimed in claim 6, wherein the third voltage converter is a DC to DC voltage converter or a low drop-out voltage regulator.

8. The multiple output voltage generator as claimed in claim 6, wherein the first output voltage is larger than each of the second output voltage, the third output voltage and the fourth output voltage.

9. A multiple output voltage generator, comprising:

a voltage divider, receiving a power voltage and dividing the power voltage to generate a first output voltage;

first and second voltage converters, coupled to the voltage divider in parallel, wherein the first voltage converter and the second voltage converter converting the first output voltage to respectively generate a second output voltage and a third output voltage;

wherein the voltage divider comprises:

a first transistor, a second transistor, a third transistor and a fourth transistor, wherein the first transistor, the second transistor, the third transistor and the fourth transistor are coupled in series between a power voltage receiving end and a reference ground end, the first transistor, the second transistor, the third transistor and the fourth transistor are respectively controlled by a first control signal, a second control signal, a third control signal and a fourth control signal, and a coupling end of the second transistor and the third transistor generates the first output voltage, a coupling end of the first transistor and the second transistor is coupled to one end of a first capacitor and a coupling end of the third transistor and the fourth transistor is coupled to the other end of the first capacitor, and the coupling end of the second transistor and the third transistor is coupled to one end of a second capacitor and the reference ground end is coupled to the other end of the second capacitor, wherein one of the first voltage converter and second voltage converter comprises:

the third transistor and the fourth transistor;

an inductor; and a capacitor, wherein the inductor and the capacitor are coupled between the coupling end of the third transistor and the fourth transistor and the reference ground end, wherein another one of the first voltage converter and the second voltage converter comprises:

a fifth transistor, having a first end receiving the first output voltage, a control end of the fifth transistor receiving a fifth control signal and a second end of the fifth transistor generating the second output voltage;

an error amplifier, receiving a feedback voltage and a reference voltage, and generating the fifth control signal according to a difference of the feedback voltage and the reference voltage; and a feedback resistor, receiving the second output voltage and generating the feedback voltage according to the second output voltage.

10. The multiple output voltage generator as claimed in claim 9, wherein the first output voltage is half of the power voltage.

11. The multiple output voltage generator as claimed in claim 9, wherein the first voltage converter is a DC to DC voltage converter or a low drop-out voltage regulator.

12. The multiple output voltage generator as claimed in claim 9, wherein a voltage endurance of the first transistor is higher than a voltage endurance of any one of the second transistor, the third transistor and the fourth transistor.

13. The multiple output voltage generator as claimed in claim 9, further comprising:
  a third voltage converter, coupled to the voltage divider, converting the first output voltage to generate a fourth output voltage.

14. The multiple output voltage generator as claimed in claim 13, wherein the third voltage converter is a DC to DC voltage converter or a low drop-out voltage regulator.

15. The multiple output voltage generator as claimed in claim 13, wherein the first output voltage is larger than each of the second output voltage, the third output voltage and the fourth output voltage.

\* \* \* \* \*